Figure 1A:
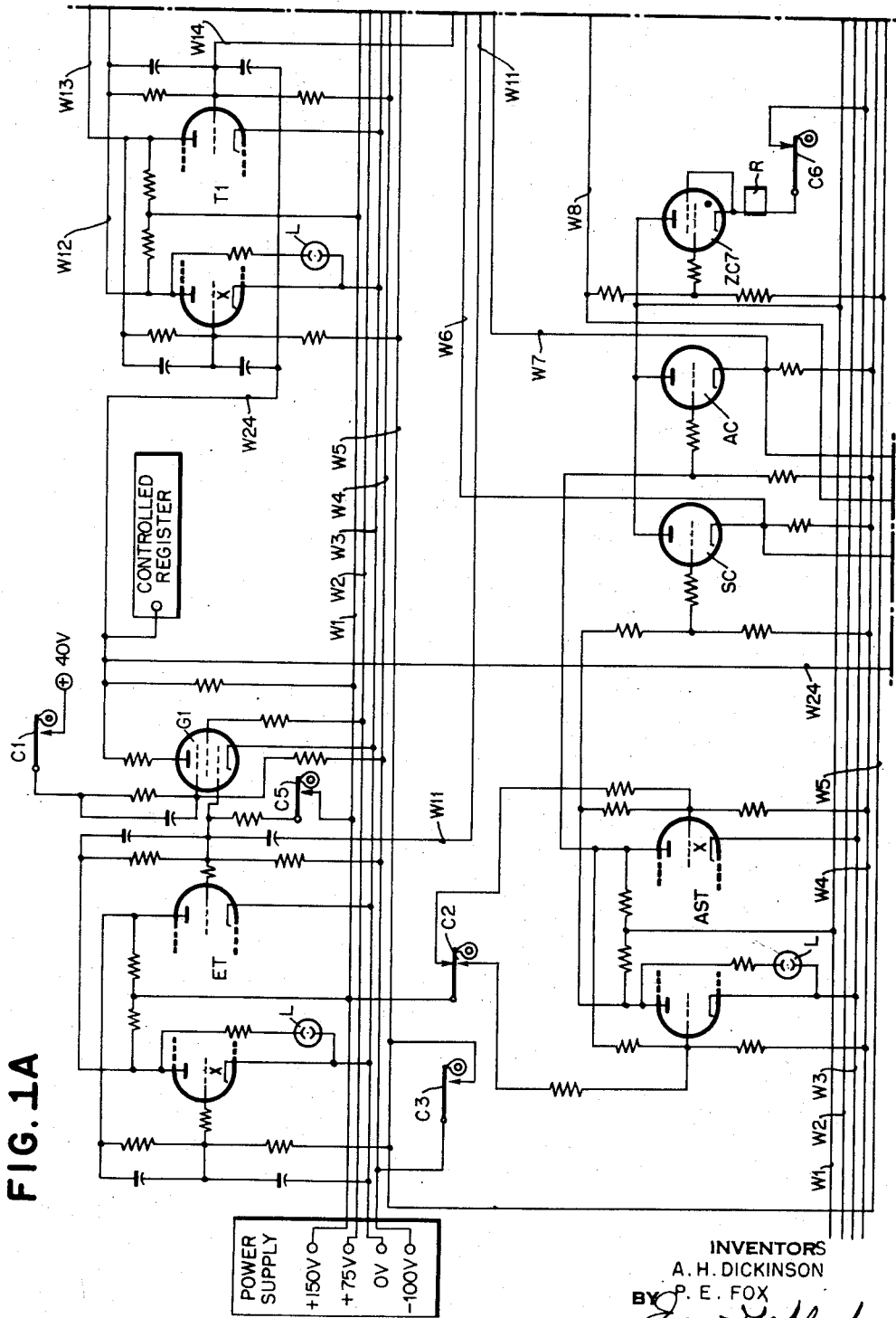

April 19, 1960

A. H. DICKINSON ET AL 2,933,251

RECORD CONTROLLED MACHINE

Filed Oct. 16, 1953

9 Sheets-Sheet 1

INVENTORS
A. H. DICKINSON
P. E. FOX
BY
ATTORNEY

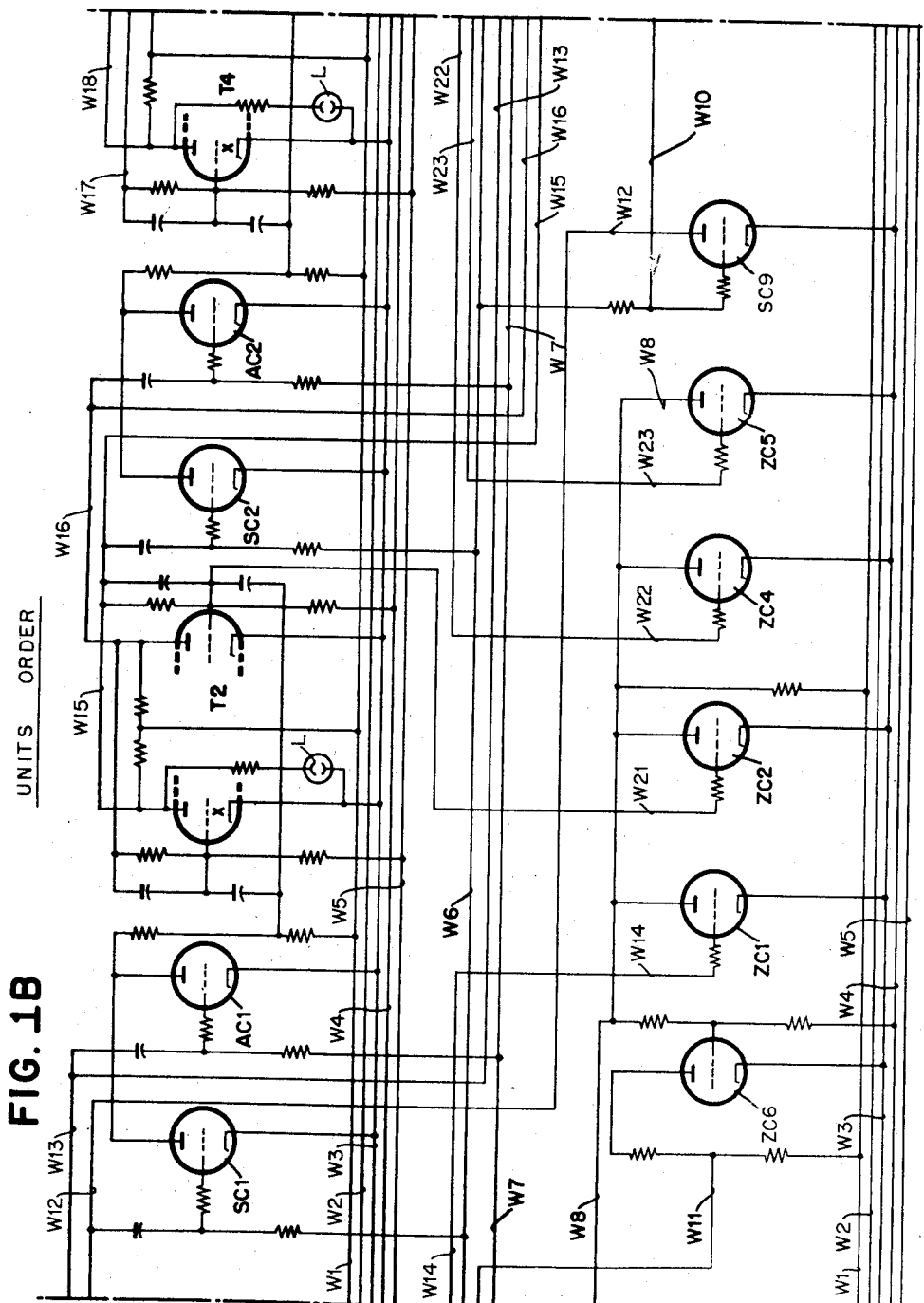

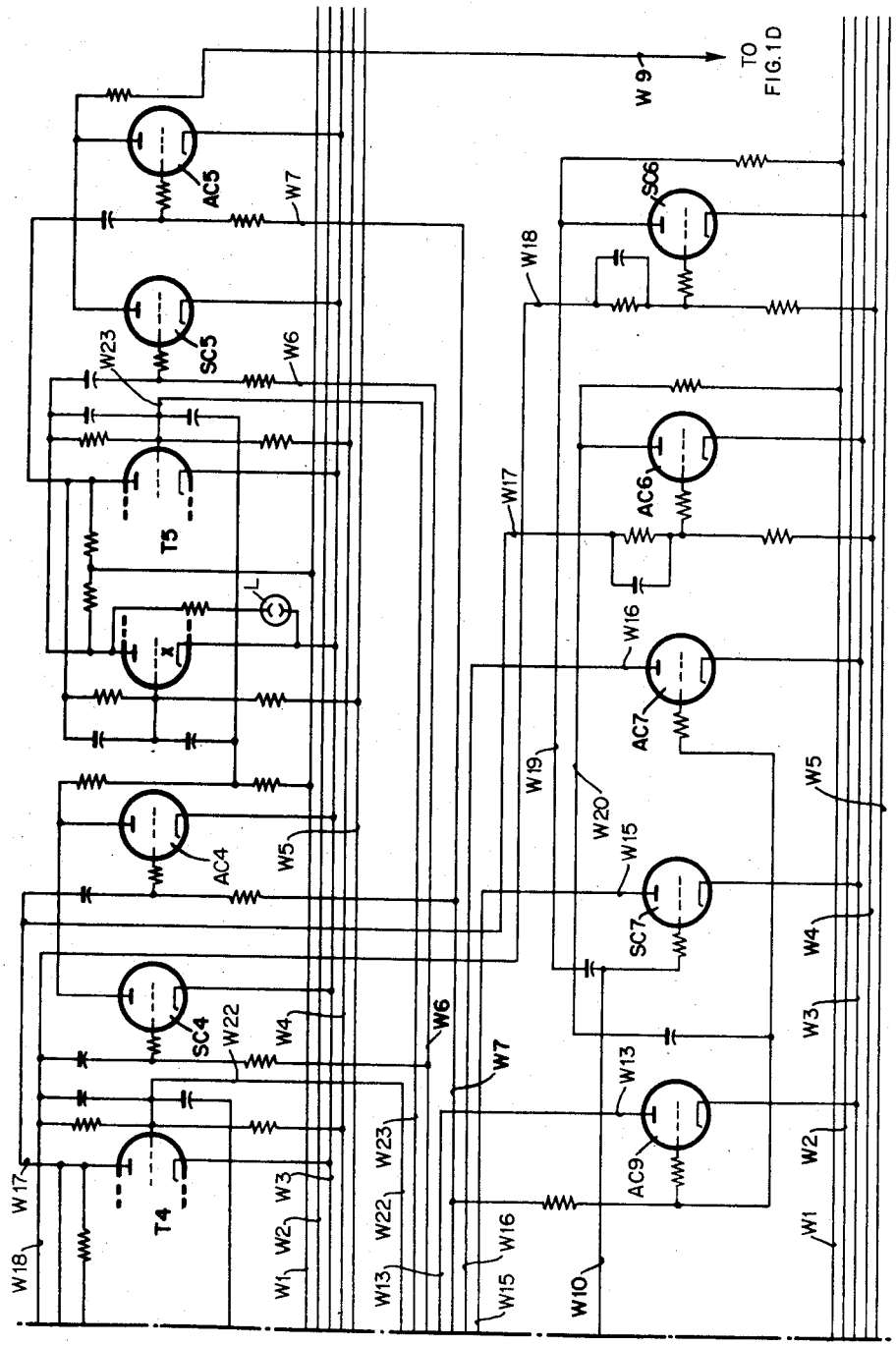

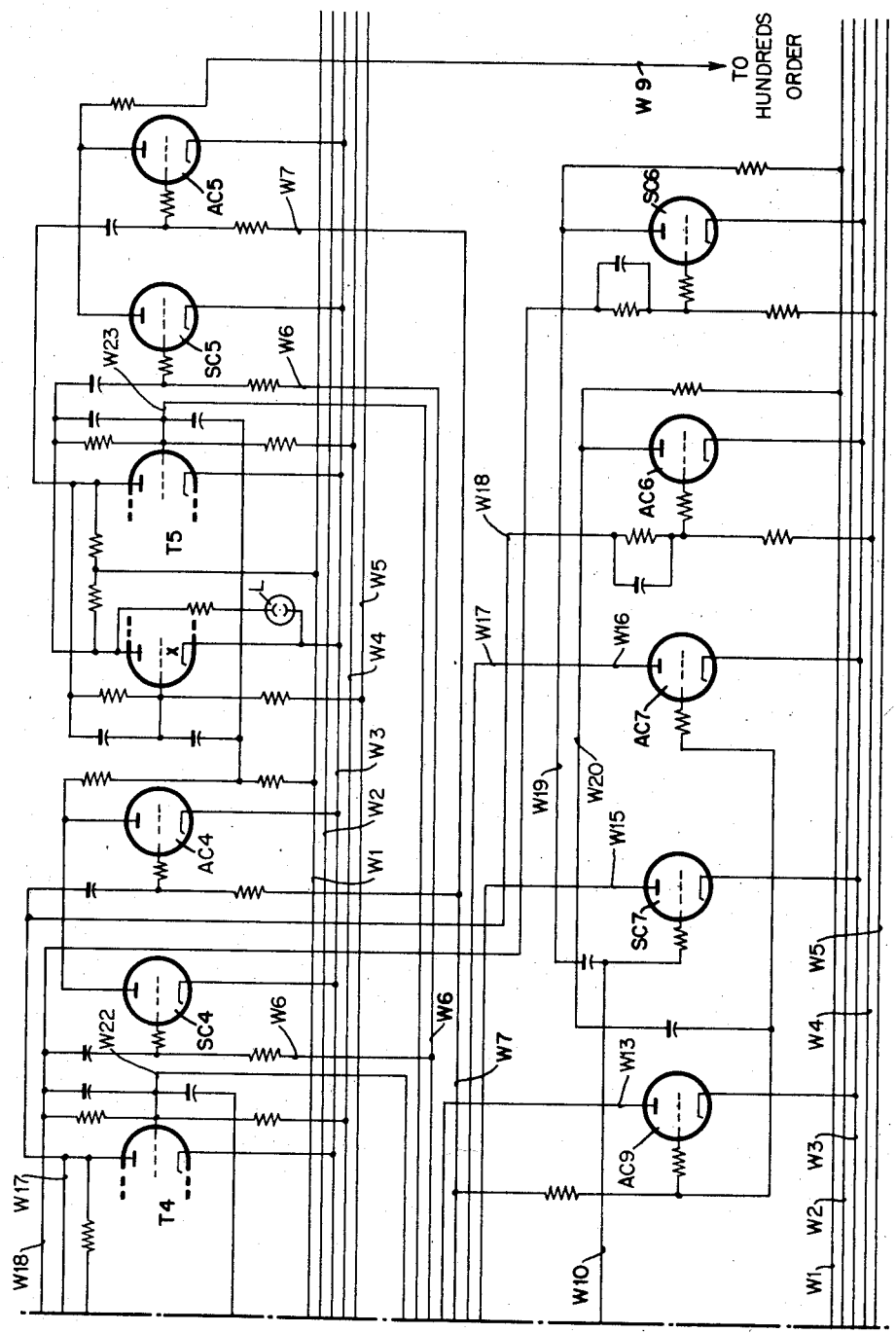

INVENTORS
A. H. DICKINSON
BY P. E. FOX
ATTORNEY

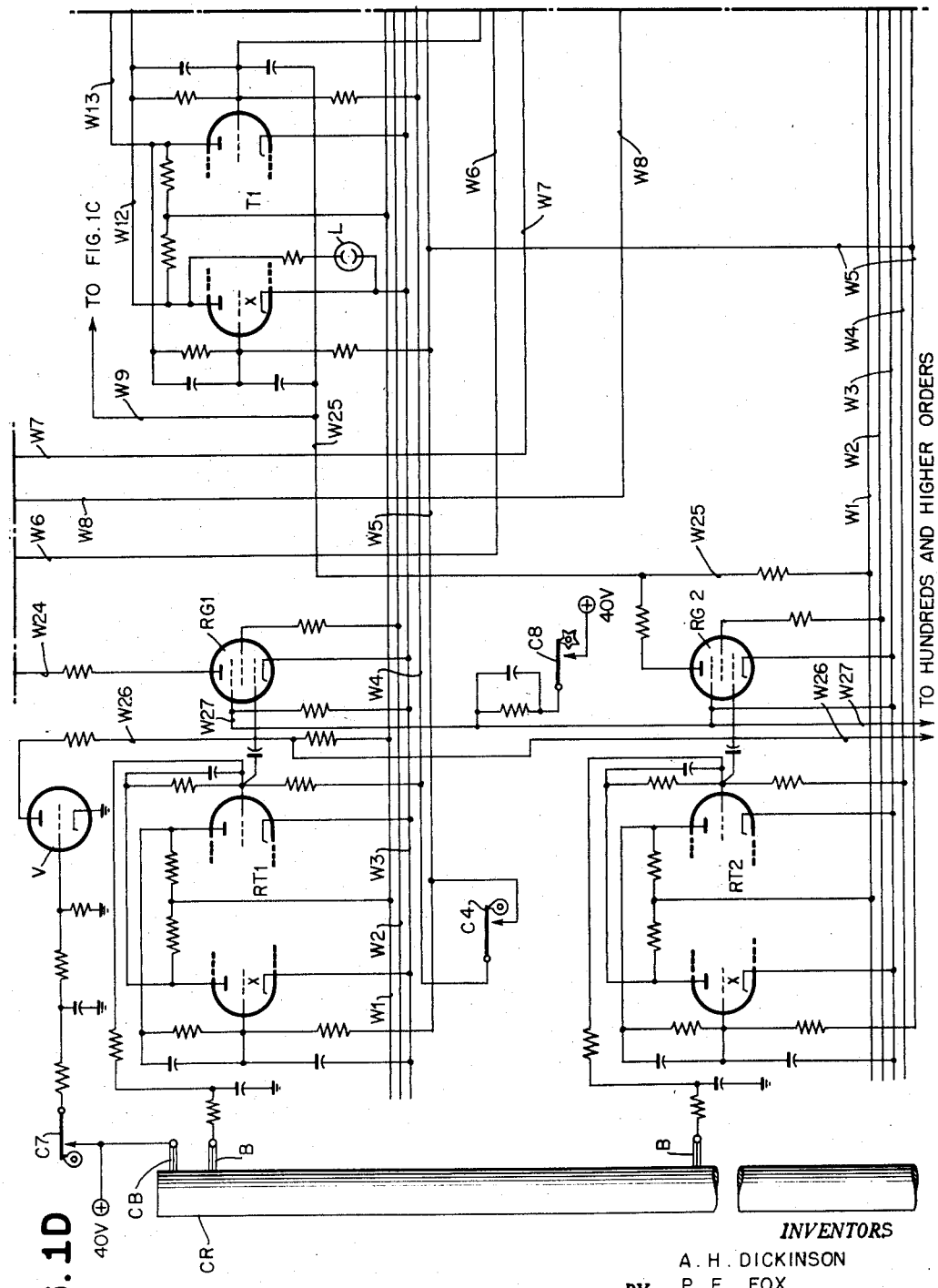

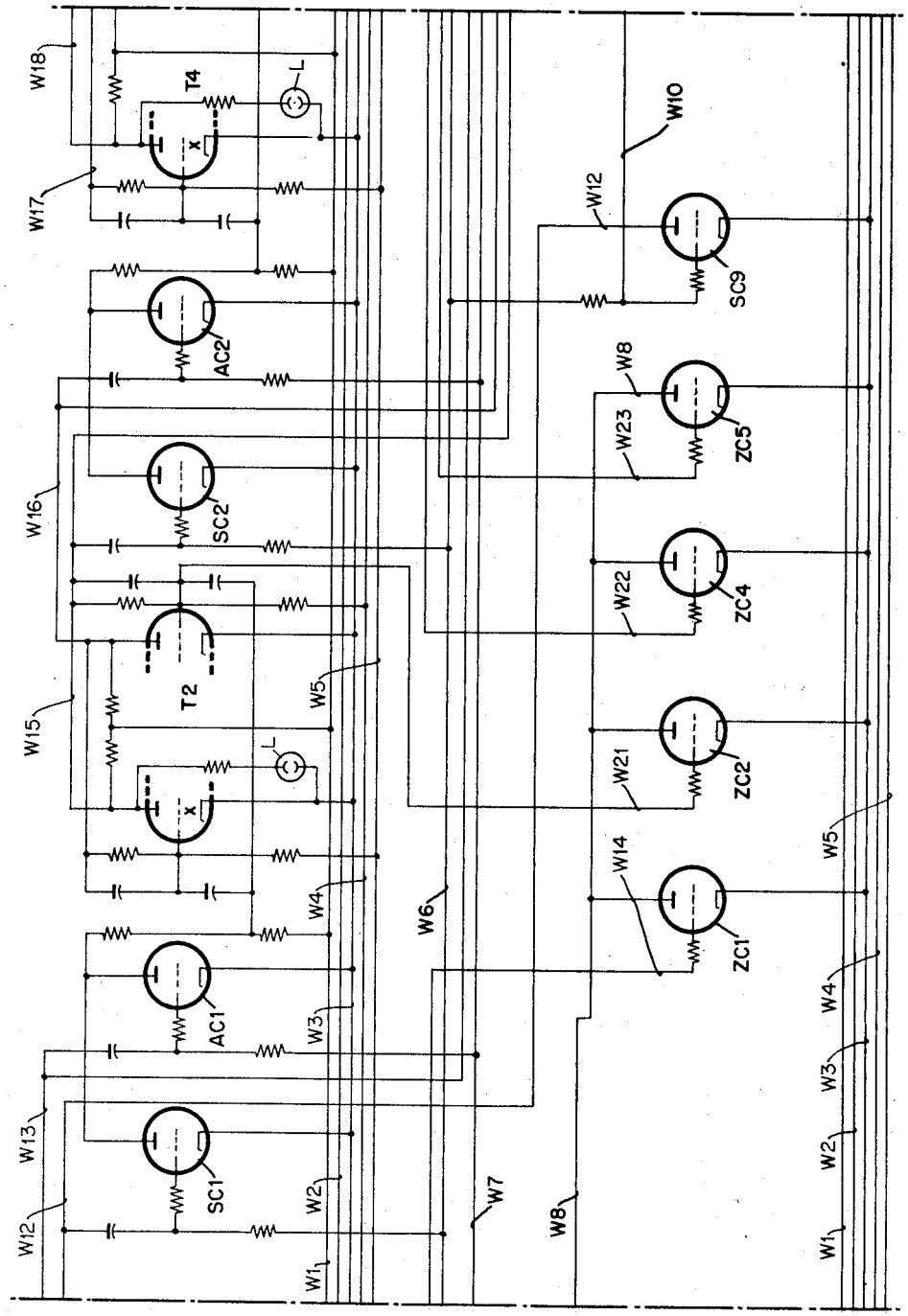

April 19, 1960    A. H. DICKINSON ET AL    2,933,251
RECORD CONTROLLED MACHINE
Filed Oct. 16, 1953    9 Sheets-Sheet 9

United States Patent Office 2,933,251
Patented Apr. 19, 1960

2,933,251

RECORD CONTROLLED MACHINE

Arthur H. Dickinson, Greenwich, Conn., and Philip E. Fox, Poughkeepsie, N.Y., assignors to International Business Machines Corporation, New York, N.Y., a corporation of New York Application October 16, 1953, Serial No. 386,526

22 Claims. (Cl. 235—170)

This invention relates to calculating machines and in particular to registers suitable for use in electronic calculating machines.

An object is to provide an improved electronic register.

An object is to provide an electronic register which is capable of either forward operation (adding) or reverse operation (subtraction).

Another object is to provide an electronic register which may be electronically selectively conditioned for adding or subtracting.

An object is to provide a reversible electronic register which is adaptable to either a quinary or a modified binary (binary decade) system with little change in circuit connections.

An object is to provide an electronic register in which the digits 0 to 9 are represented in two different code positions, one for adding and the other for subtracting, according to the type of operation and direction of progression or regression of the register, but which is nevertheless capable of correct read out of the result regardless of the pattern displayed at the time of read out.

An object is to provide an electronic register comprising a plurality of orders each having a series of triggers representing the quinary bit values 1, 2, 4, 5, or the binary bit values 1, 2, 4, 8, in which the triggers are coupled in cascade by add-subtract switch tubes selectively made effective to cause the register to operate forwardly (add) or reversely (subtract) in combination with correcting tubes for producing a feed-back from the quinary "4" or binary "8" stages to effect a conversion to the quinary or binary decimal systems.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1A to 1F, when Figs. 1A to 1C are assembled in the order named from left to right over Figs. 1D to F in the same order, together comprise a wiring diagram of a quinary decimal register embodying the features of the present invention.

Figure 2A:
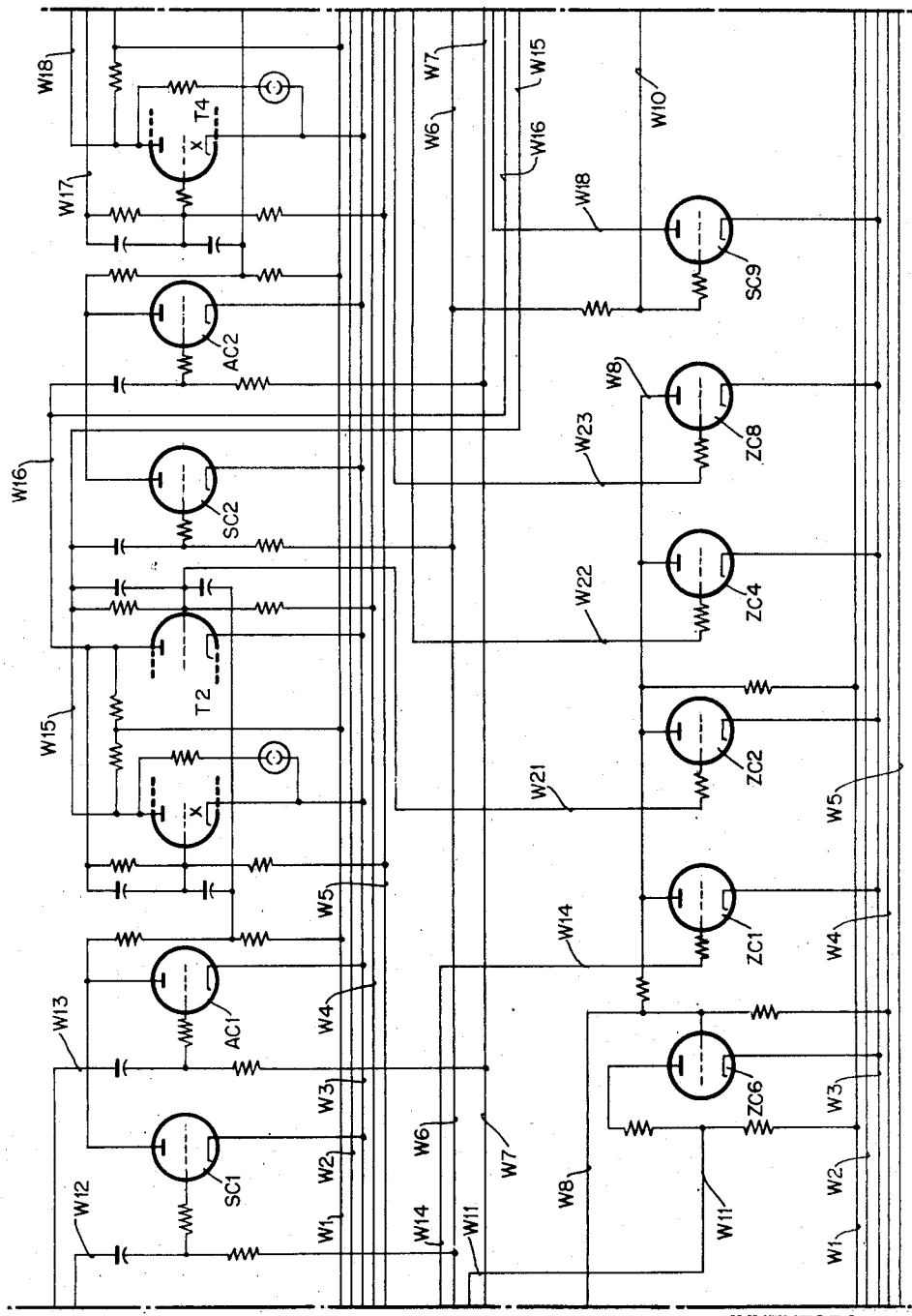
Figure 2B:
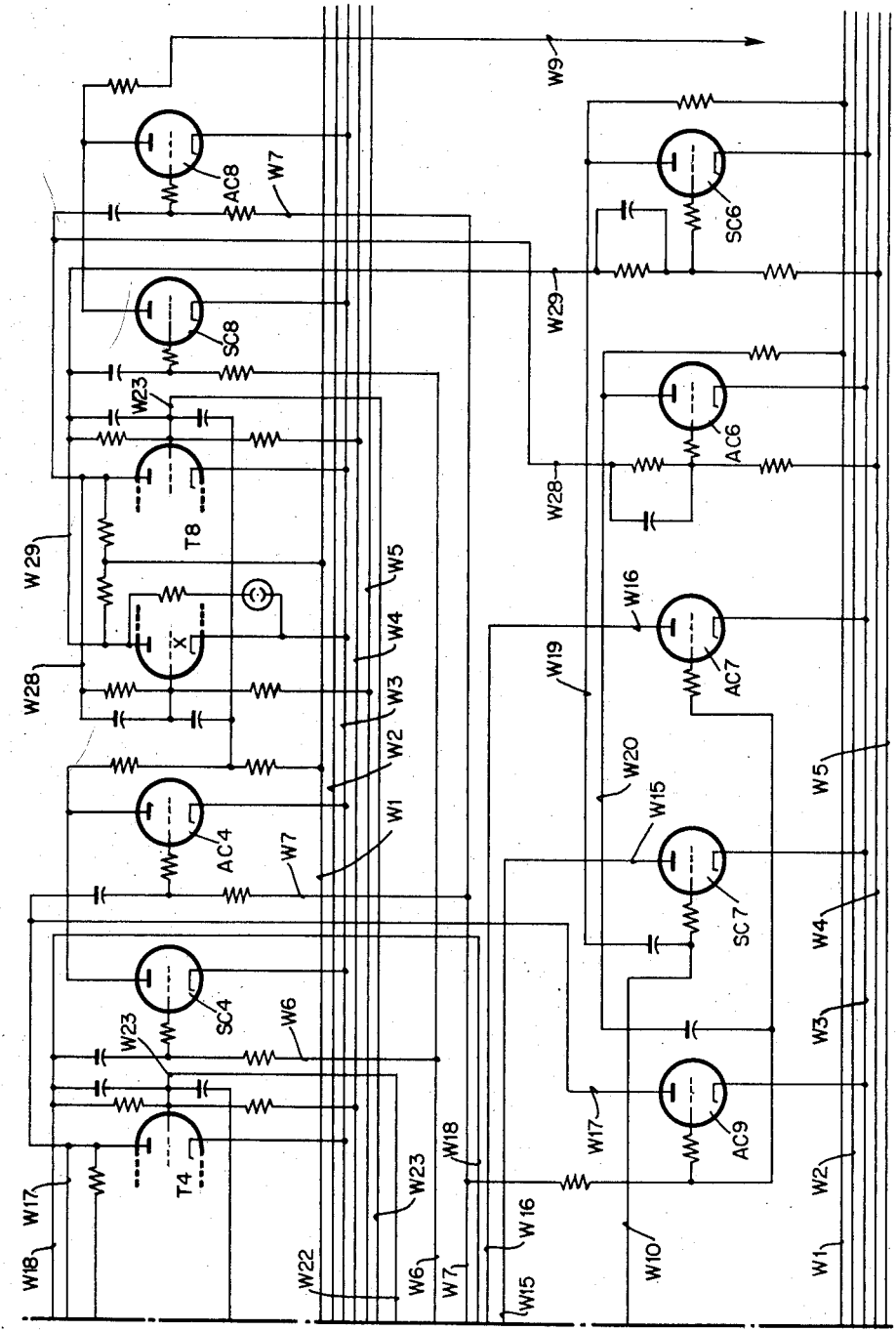

Figs. 2A to 2B when substituted for Figs. 1B and 1C illustrate how easily the units order of the quinary register may be converted to a modified binary (binary decade) register.

Figure 3:
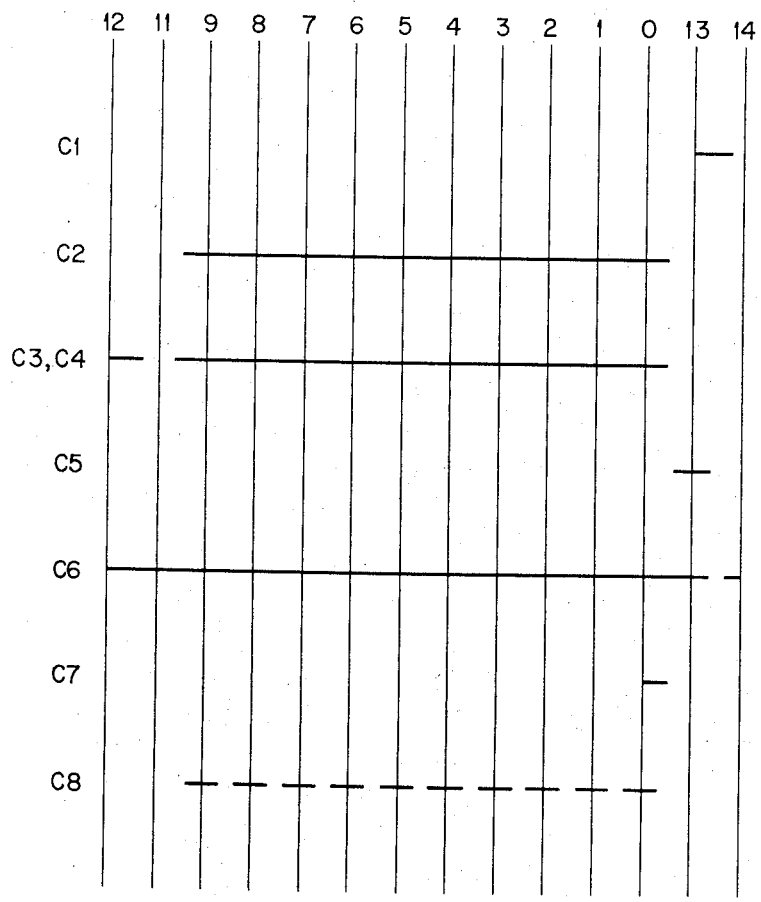

Fig. 3 consists of a timing diagram of the cam controlled contact devices of Figs. 1A and 1D.

The operation of the register will be made clear in somewhat diagrammatic fashion hereinafter in reference to a conventional form of so-called "reproducer" of which the basic structure is disclosed in patent Re. 21,133. As shown in this patent, the machine is provided with means to sense a master card and reproduce by punching in detail cards any desired data appearing in the master card. It is a well-known fact that this type of machine has been extensively used in many of the commercially available electronic computers or so-called "electronic data processing machines" as the means for inserting data in the computer and recording the results of computations in cards.

In order to illustrate the invention, it will first be described in a quinary form of register and then its modification to adapt it to the binary form will be explained.

The register comprises a plurality of orders, each including a series of trigger stages designated T1, T2, T4, and T5 in Figs. 1A to 1C. Each trigger stage may consist of two cross coupled triodes connected in a conventional type such as might be used in an ordinary binary electronic counter or accumulator. In the present case the register will be operated according to a quinary system in which the numerical suffixes in the designations of the trigger stage and certain related parts correspond to the quinary system values 1, 2, 4, and 5.

The electronic register is shown in the drawings as comprising only two denominational orders, namely, the units and tens orders, but for simplicity of description it will be understood that as many orders as desired may be provided, it being merely necessary to repeat the pattern of wiring for triggers T1, T2, T4, T5 in Figs. 1D, 1E and 1F for each stage. In the present case the register may be selectively operated forwardly, that is, by adding, or in reverse, as for subtracting, and for this purpose the trigger stages T1, T2, T4 and T5 for each order are coupled in cascade by means of the subtract control tubes SC1, SC2, SC4, SC5 and the adding control tubes AC1, AC2, AC4, and AC5, these tubes being related to the triggers and certain zero control tubes according to their numerical suffixes.

In the progression of the register orders in adding and subtraction it is necessary to make certain corrections and for this purpose there are provided the subtraction control correcting tubes SC6, SC7, SC9 (Figs. 1B, 1C, 1E, and 1F), and the adding control connecting tubes AC6, AC7, AC9.

A quinary register, in which the stages represent the bit values 1, 2, 4, 5 is capable of counting to 12, and a binary register having 1, 2, 4, 8 stages counts to 16, before the stages resume their original "Off" status representing "0." When a decimal register is made up of sets of 1, 2, 4, 5 or 1, 2, 4, 8 stages in cascade, it is necessary to effect corrections so that the register orders will return to zero status each time a count of ten is reached. In the present case, the necessary corrections are made in two steps in the case of the quinary code and in a single step for the binary code in a manner described hereinafter.

These adding and subtraction control tubes are rendered operative and inoperative, according to whether the register is subtracting or adding by means of the subtraction control inverter tube SC (Fig. 1A) and the adding control inverter AC. These tubes are in turn controlled by an add-subtract trigger AST (Fig. 1A) which renders one or the other of the tubes SC, AC conductive according to the status of the add-subtract trigger. The trigger AST, in this simple illustration, may be controlled by the contacts C2 which are normally in subtract position to render the trigger AST conductive, or "Off," on the right hand side.

During the first effective card cycle of the machine the contacts C2 (Fig. 1A) are operated to close a circuit to apply a positive potential to the grid of the left hand side of the trigger AST to render it conductive in "On" status.

This causes the anode potential of the left hand half of the trigger AST to drop and cut off the subtract control tube SC. At the same time the potential on the right hand anode of trigger AST rises sharply and causes the inverter tube AC to conduct.

The tubes SC, AC are cathode followers and the cathode of the tube SC is connected to the subtract bias wire W6 while the cathode of the tube AC is connected to the add bias wire W7. As will be noted in Figs. 1B, 1C (units order) and 1E, 1F, (tens order), the grids of the tubes AC1, AC2, AC4, AC5, AC7, and AC9 are connected to the add bias wire W7 while the grids of the related tubes SC1, SC2, SC4, SC5, SC7, and SC9 are connected to the subtract bias wire W6. When the tube AC is rendered conductive by trigger AST, its cathode potential rises sharply thus raising the bias potential on the grids of the tubes AC1, AC2, AC4, AC5, AC7, and AC9 to a point a little below the cut-off point, placing these tubes in condition for conduction when a positive pulse of proper value is applied to any grid thereof from one of the triggers T1, T2, T4, T5.

Similarly, when the status of the trigger AST is reversed and the right hand side is made conductive, tube SC will conduct causing a sharp rise in its cathode potential and the bias potential of the tubes SC1, SC2, SC4, SC5, SC7, and SC9 will be raised to just below the cut-off point.

Thus, by controlling the status of the trigger AST, the electronic register may be caused to add or subtract.

During the first effective card cycle, values punched in appropriate columns of the record card will be entered in the units and tens orders of the register through conventional means which may consist of suitable readin circuits which are shown in Fig. 1D. These readin circuits may be of any desired form and include the card sensing brushes B (Fig. 1D), the contact roll CR, the readin triggers RT1, RT2, and the readin gates RG1, RG2. The readin triggers RT1, RT2 are reset to "Off" status by opening the contact C4 prior to sensing the record card and the readin gates RG1, RG2 are pulsed at intervals during the sensing of the card by the circuit breaker C8 so that gated digit-representative trains of pulses controlled by brushes B in a well-known way are emitted over the wires W24, W25 to the triggers T1 of the units and tens orders, respectively, of the electronic register. Contacts C7 close at the end of the sensing period and cause inverter tube V to conduct momentarily producing a negative pulse on wire W26 which turns "Off" all triggers RT1, RT2, etc.

For the purpose of explaining the operation of the electronic register in adding, let it be assumed that 79 cards are to be punched with a predetermined number, so that it is necessary to enter "9" in the units order of the register and "7" in the tens order. As explained above these entries will be made by a train of nine gated pulses which will be transmitted over the wire W24 to the first stage trigger T1 of the units order of the register and seven gated pulses correspondingly will be transmitted over wire W25 to the trigger T1 of the tens order. Since the operation is the same in both the units and tens orders, the description of the operation will be largely confined hereinafter to the units order.

It will be assumed that the electronic register has been reset by a previous operation and that the triggers T1, T2, T4, and T5 are in "Off" status with the left hand sides of each of the triggers conducting as indicated by the letter "X" located between the grids and the cathodes.

The first of the nine pulses over the wire W24 will turn the units order trigger T1 (Fig. 1A) "On" rendering its right hand side conductive. Since the add-subtract trigger AST is now in "On" status, the tube AC will be conductive, thereby conditioning the tubes AC1, AC2, AC4, AC5 for conduction. When the trigger T1 (Fig. 1A) goes "On," it causes the storage of the value "1" and nothing else happens for the moment. When the second pulse of the train of nine turns trigger T1 "Off" again, the potential of the right-hand anode of trigger T1 will rise sharply producing a positive pulse of sufficient value to render the tube AC1 conductive. This produces a sharp drop in the anode potential of tube AC1 which is transmitted to the left hand grid of trigger T2 cutting off the trigger and transferring it to "On" status with the right hand half thereof conductive. Thus, after the second pulse, trigger T2 is rendered conductive in "On" status. The third pulse causes trigger T1 to go "On" again.

The fourth pulse initially turns trigger T1 "Off" and in doing so passes a negative pulse to trigger T2 turning this trigger "Off." Since tube AC2 is now capable of conducting, the turning of trigger T2 "Off" causes a negative pulse to be applied to the grids of trigger T4 through the inverter tube AC2 thereby turning trigger T4 "On." A negative pulse is produced at the right hand anode of trigger T4 and is transmitted over wire W17 to the grid of tube AC6 cutting it "Off." This causes the anode potential of tube AC6 to rise sharply and render the tubes AC7 and AC9 conductive by means of wire W20. The anodes of the tubes AC7, AC9 are connected to the right hand anodes of the triggers T2 and T1 by wires W16 and W13, respectively, and the sudden drop in anode potential causes the triggers T1, T2 to be turned "On." Thus, after the fourth pulse, the triggers T1, T2, T4 will all be turned "On" and trigger T5 remains turned "Off."

The fifth pulse turns the trigger T1 "Off" which in turn turns "Off" trigger T2. Trigger T2 turns "Off" trigger T4, and the latter turns "On" T5. Thus, at this point, the units order has registered the value "5." For the next four impulses the progression of the units order as just described is repeated differing only in that during this period the trigger T5 remains in "On" status. Thus, at the end of nine pulses all four triggers T1, T2, T4, T5 will be in "On" status to designate the value "9," the tubes AC6, AC7, and AC9 being again operative upon the ninth pulse to turn the triggers T1, T2 "On."

If another pulse were applied at this point, as would be the case if more than nine pulses were to be added, all four triggers T1, T2, T4, T5 will be turned "Off," producing a carry pulse which is applied over wire W9 to the tens order trigger T1 which will have the same effect on the tens order as the first pulse had in the units order. The effect of the carry pulse when subtracting will be made clear hereinafter.

The progression of the units order from 0 to 9 described above is made clear by the following table:

TABLE I.—ADDING—QUINARY

| Pulse | Trigger Representation | | Triggers | | | |
|---|---|---|---|---|---|---|
|  | Digit Value | Accumulated Stage Values | T1 | T2 | T4 | T5 |
|  | 0 | 0 | O | O | O | O |
| 1 | 1 | 1 | X | O | O | O |
| 2 | 2 | 2 | O | X | O | O |
| 3 | 3 | 3 | X | X | O | O |
|  |  | 4 (initial) | O | O | X | O |
| 4 | 4 | 7 (corrected) | X | O | X | O |
| 5 | 5 | 5 | O | O | O | X |
| 6 | 6 | 6 | X | O | O | X |
| 7 | 7 | 7 | O | X | O | X |
| 8 | 8 | 8 | X | X | O | X |
| 9 |  | 9 (initial) | O | O | X | X |
| 10 | 9 | 12 (corrected) | X | X | X | X |
|  | 0 | 0 | O | O | O | O |

"O"=Trigger "Off."
"X"=Trigger "On."

In the tens order a similar progression will take place except that the operation will be terminated with the triggers T2 and T5 in "On" status to register "7."

Near the end of the card reading cycle contacts C2 (Fig. 1A) transfer and trigger AST is turned "Off" thereby rendering the tube SC conductive and the tube AC non-conductive. This causes the potential on the "Add" bias wire W7 to drop to a point so far below cut-off that the tubes AC1, AC2, etc., cannot be affected by positive pulses applied to their grids from the right hand anodes of the trigger stages T1, T2, T4, T5. The bias level on wire W6 rises sufficiently to prime the tubes SC1, SC2, SC4, SC5, SC7, SC9. The register is now conditioned for such subtraction.

Contacts C5 now close and render the entry trigger ET conductive on its right hand side. The control grid of the gate G1 is held substantially at potential of the right hand grid of trigger ET. Shortly after this the contacts C1 close momentarily and apply a positive pulse to the suppressor grid of gate G1 thereby causing the gate G1 to conduct momentarily and the sharp drop in anode potential produces a negative entry pulse to subtract "1" which is applied over wire W24 to the grids of the trigger T1 to reverse the status of the trigger which is now in "On" condition. The turning of trigger T1 "Off" now has no effect on the trigger T2 because the sharp rise in potential on the right hand anode of the trigger is applied to the grid of tube AC1 which is not primed for conduction and the negative pulse produced on the left hand anode of the trigger T1 merely makes the grid of tube SC1 more negative. At the end of the first pulse entry the triggers T2, T4, T5 remain "On" and trigger T1 "Off" which now represents the digital value "8".

During this first card cycle the punch side of the reproducer punches a first detail card under control of the master card in a well-known way and another detail card feeding cycle ensues.

A succession of 78 card feeding cycles will now follow the first master card reading and detail card punching cycle so that a total of 79 detail cards will be punched under control of the register. During each of these cycles the register will be pulsed once, which has the effect, as described above, of subtracting a unit from the register.

During the second detail card feeding cycle the contacts C1, C5 are again operative to cause a second negative pulse to be applied to the trigger T1 over wire W24 thereby turning it "On" and the sharp rise in potential on the left hand anode of trigger T1 is applied to the grid of the tube SC1 rendering it conductive and producing a negative pulse on the anode thereof which is applied to the grids of the trigger T2 turning it "Off". Triggers T4 and T5 are not affected.

The third pulse turns T1 "Off" without disturbing the other triggers leaving the triggers T4 and T5 in "On" status which represents the value "6".

The fourth pulse initially turns trigger T1 "On" which, in turn, turns triggers T2 "On". Trigger T4 then is turned "Off" and trigger T5 remains "On". When trigger T4 is turned "Off" as a consequence of the fourth pulse, a negative pulse is applied over wire W18 to the grid of tube SC6 thereby cutting this tube "Off" and producing a positive pulse on wire W19 which is applied to the grids of the tubes SC7, SC9. The anodes of these tubes are connected by wires W15 and W12 to the left hand anodes of the triggers T2 and T1, respectively, causing the triggers T2 and T1, respectively, to turn "Off".

Since trigger T4 has already been turned "Off", the fourth pulse leaves the units order register with all of the triggers turned "Off" except trigger T5.

The sequence just described is repeated for the next five pulses as far as the triggers T1, T2 and T4 are concerned and trigger T5 is additionally turned "Off" when trigger T4 is turned "On" by the fifth pulse.

The ninth pulse causes the functioning of the tubes SC6, SC7, SC9, as described above, to force the triggers T1, T2 "Off" thereby terminating the subtractive entry of nine pulses under the control of the contacts C1, C5 with all of the triggers in "Off" condition, which, of course, is zero.

The regression of the units order from 9 to 0 as described above is made clear by the following table:

TABLE II.—SUBTRACTING—QUINARY

| Pulse | Trigger Representation | | Triggers | | | |
|---|---|---|---|---|---|---|
| | Digit Value | Accumulated Stage Values | T1 | T2 | T4 | T5 |
| 1 | 9 | 12 | X | X | X | X |
| 2 | 8 | 11 | O | X | X | X |
| 3 | 7 | 10 | X | O | X | X |
| 4 | 6 | 9 | O | O | X | X |
| | | 8 (initial) | O | X | O | X |
| | 5 | 5 (corrected) | O | O | O | X |
| 5 | 4 | 7 | X | X | X | O |
| 6 | 3 | 6 | O | X | X | O |
| 7 | 2 | 5 | X | O | X | O |
| 8 | 1 | 4 | O | O | X | O |
| | | 3 (initial) | X | X | O | O |
| 9 | 0 | 0 (corrected) | O | O | O | O |

The tenth pulse produced by the contacts C1, C5 will turn trigger T1 "On" again, the trigger T1 will turn "On" trigger T2, trigger T2 will turn "On" trigger T4, and trigger T4 will turn "On" trigger T5 so that the units order again registers "9." However, in turning trigger T5 "On," a positive pulse is applied to the grid of tube SC5 causing it to conduct and producing a negative carry pulse on its anode which is transmitted over wire W9 to the trigger T1 of the tens order (Fig. 1D). This unit applied to the tens order reduces the tens orders from "7" to "6" by turning the tens order trigger T1 "On" and turning "Off" trigger T2, leaving the tens order with only the triggers T1, T5 in "On" status.

In the above tables the units order has been carried from zero to "9" by addition (Table I) and then (Table II) back to zero again. The units order is carried from "9" through zero and back to "9" with each successive group of 10 pulses of the contacts C1, C5 and for each of these groups of 10 pulses a single pulse will be applied to the tens order trigger T1 under control of the tube SC5, as described above, reducing the tens order from "7" to zero.

The tens order initially registered "7" in the adding code (Table I) and the first mentioned carry pulse, by its subtractive effect converts the tens order trigger representation to X—O—O—X which represents "6" in the subtracting code (Table II). After this initial carry pulse, the tens order will regress in the subtracting code (Table II) until the order reaches zero.

Means are provided to terminate entry operations momentarily and cause energization of the usual card feeding clutch on the reading side of the machine to feed a new master card when the electronic register arrives at zero. For this purpose there is provided a zero detecting device which includes the tubes ZC1, ZC2 and ZC4 to ZC7. The anodes of the tubes ZC1, ZC2, ZC4, ZC5 are connected by common wire W8, in both orders of the electronic register, to the grids of the zero control tubes ZC6, ZC7. The grids of the tubes ZC1, ZC2, ZC4, ZC5 are connected by wires W14, W21, W22, W23 to the right hand grids of the tubes T1, T2, T4, T5, respectively, so that the tubes ZC1, ZC2, etc., will assume the same status as the right hand grids of the triggers T1, T2, etc. When the triggers T1, T2, etc., are all "Off," the tubes ZC1, ZC2, etc., will similarly be cut off. However, the operating conditions of these tubes are such that if any one of them is conductive the grids of the tube ZC6, ZC7 will be maintained at below cut-off potential. When the last trigger T1, T2, T4, T5 is turned "Off" while any order goes to zero, the potential on the grid of gas tube ZC7 will rise sharply causing this tube to conduct and energize the relay R, the contacts of which are in circuit with the usual reproduce clutch magnet (not shown), and causes the feeding of master cards to resume on the reproducing side of the machine for one cycle. During this cycle the contact C6 opens and deionizes the tube ZC7.

The tube ZC6 is also rendered conductive when the register goes to zero, thereby producing a negative impulse on wire W11 which is applied to the right hand grid of the entry trigger ET forcing it into "Off" status which opens the gate G1.

The feeding of the next master card causes a new quantity to be entered in the electronic register in the manner explained above and the entry trigger ET is again turned "On" to render the gate G1 effective in succeeding card cycles for the punching of a new series of cards equal in quantity to the value entered in the register.

For the purpose of making clear the operation of the electronic register there has been selected a very simple case involving the use of a card reproducer such as the one disclosed in patent Re. 21,133 where it is required to punch a definite number of cards with specified data which may be derived directly from master cards, as, for example, a particular account number. However, the invention is not limited in use to a machine of the foregoing type but also may be usefully employed in various electronic computers where it may be used, for example, to control sequencing in multiplication or division. In such machines there is often the necessity for terminating computing operations after a specified number of cycles have taken place as, for example, when the dividend has been reduced to zero by repeated cycles of addition and subtraction to signal the fact that computing operations have been terminated. An illustration of the applicability of the register disclosed herein and the associated zero controls in a multiplying and dividing machine may be had by reference to copending application Serial No. 386,462, filed October 16, 1953, now Patent No. 2,802,625, by A. H. Dickinson in which the binary form of the register is used.

Figs. 2A and 2B show how the quinary form may be converted to a modified binary decimal register merely by changing the connections of wires W17, W18, from tubes AC6, SC6 to tubes AC9, SC9; eliminating the connection of wires W12, W13, to tubes SC9, AC9, and changing connections of tubes AC6, SC6 from triggers T4 to triggers T8 by wires W28, W29 (Fig. 2B).

The following table shows the effect of adding "9" and "1" by a succession of ten pulses and is similar to Table I:

TABLE III.—ADDING—BINARY

| Pulse | Trigger Representation | | Triggers | | | |
|---|---|---|---|---|---|---|
| | Digit Values | Accumulated Stage Values | T1 | T2 | T4 | T8 |
| | 0 | | O | O | O | O |
| 1 | 1 | 1 | X | O | O | O |
| 2 | 2 | 2 | O | X | O | O |
| 3 | 3 | 3 | X | X | O | O |
| 4 | 4 | 4 | O | O | X | O |
| 5 | 5 | 5 | X | O | X | O |
| 6 | 6 | 6 | O | X | X | O |
| 7 | 7 | 7 | X | X | X | O |
| 8 | | 8 (initial) | O | O | O | X |
| | 8 | 14 (corrected) | O | X | X | X |
| 9 | 9 | 15 | X | X | X | X |
| 10 | 0 | 0 | O | O | O | O |

It will be noted that the units order will function like a binary counter for the first seven pulses. The eighth pulse will initially cause trigger T8 to turn "On" and the others "Off." In turning "On," trigger T8 will cut off tube AC6 by a negative pulse as described above for the quinary form, tubes AC7, AC9 will conduct, and cause triggers T2, T4 to turn "On" again. Thus a count of 8 is converted to 14. The ninth pulse counts as 15. A tenth pulse will count as 16 and turn all of the triggers T1, T2, T4, T8 "Off" leaving the order at zero.

The regression of the units order from "9" back to zero, by nine subtracting pulses, is shown in the following table, which is similar to Table II for the quinary form:

TABLE IV.—SUBTRACTING—BINARY

| Pulse | Trigger Representation | | Triggers | | | |
|---|---|---|---|---|---|---|
| | Digit Values | Accumulated Stage Values | T1 | T2 | T4 | T8 |
| | 9 | 15 | X | X | X | X |
| 1 | 8 | 14 | O | X | X | X |
| 2 | 7 | 13 | X | O | X | X |
| 3 | 6 | 12 | O | O | X | X |
| 4 | 5 | 11 | X | X | O | X |
| 5 | 4 | 10 | O | X | O | X |
| 6 | 3 | 9 | X | O | O | X |
| 7 | 2 | 8 | O | O | O | X |
| 8 | | 7 | X | X | X | O |
| | 1 | 1 (corrected) | X | O | O | O |
| 9 | 0 | 0 | O | O | O | O |

It will be observed that the eighth pulse first turns "On" triggers T1, T2, T4 and turns trigger T8 "Off." Tube SC6 is cut off by the negative pulse from trigger T8 on wires W29 which causes tubes SC7, SC9 to conduct and turn triggers T2, T4 "Off" again, equivalent to subtracting 6 changing "7" to "1." The ninth pulse then turns "Off" trigger T1 leaving the units order at zero.

Tables I and II show the code patterns for the digit representations in a quinary system while Tables III and IV show the code patterns for the modified binary system, for addition and subtraction. These code patterns are compared in the following tables:

TABLE V.—QUINARY REGISTER

| Digit | Trigger Status | | | | | | | |
|---|---|---|---|---|---|---|---|---|
| | Adding | | | | Subtracting | | | |
| | T1 | T2 | T4 | T5 | T1 | T2 | T4 | T5 |
| 0 | O | O | O | O | = O | O | O | O |
| 1 | X | O | O | O | O | X | O | O |
| 2 | O | X | O | O | O | O | X | O |
| 3 | X | X | O | O | O | X | X | O |
| 4 | X | X | X | O | = X | O | O | O |
| 5 | O | O | O | X | = O | O | O | X |
| 6 | X | O | O | X | O | X | O | X |
| 7 | O | X | O | X | O | O | X | X |
| 8 | X | X | O | X | O | X | X | X |
| 9 | X | X | X | X | = X | O | O | X |

TABLE VI.—BINARY REGISTER

| Digit | Trigger Status | | | | | | | |
|---|---|---|---|---|---|---|---|---|
| | Adding | | | | Subtracting | | | |
| | T1 | T2 | T4 | T8 | T1 | T2 | T4 | T8 |
| 0 | O | O | O | O | = O | O | O | O |
| 1 | X | O | O | O | = X | O | O | O |
| 2 | O | X | O | O | O | O | O | X |
| 3 | X | X | O | O | X | O | O | X |
| 4 | O | O | X | O | O | X | O | X |
| 5 | X | O | X | O | X | X | O | X |
| 6 | O | X | X | O | O | O | X | X |
| 7 | X | X | X | O | X | O | X | X |
| 8 | O | O | O | X | = O | X | X | X |
| 9 | X | O | O | X | = X | X | X | X |

It will be noted that, except for the digits 0, 4, 5, 9 in the quinary and 0, 1, 8, 9 in the binary codes, the representation of digits in the adding code is different from the corresponding subtracting code. Nevertheless any value represented by the combination of trigger states of an order, whether in adding or subtracting code, will be properly read out of the order when the order is "rolled" by feeding the register readout pulses in any of the usual ways. The code assumed during any operation will depend on the initial code status (adding or subtracting code) and the nature of the operation. This may be shown by a number of examples.

*Example 1.—9 minus 4=5*

According to Table II, four pulses will cause the affected order to regress from the combination X—X—X—X to the combination O—O—O—X representing "5" which obviously will read out to punch or print as a "5" if the order is rolled ten pulses by addition since "5" is coded the same for both addition and subtraction (Table V).

Similarly, in Table IV the order will regress from X—X—X—X to X—X—O—X representing "5" in the subtracting code in the binary form of register.

The progression of the order in rolling by addition is as follows:

TABLE VII.—BINARY

| Index Time | Readout Pulse | Trigger Status and Representation |
|---|---|---|
| 9 | 1 | X—X—O—X=5 in subtracting code. |
| 8 | 2 | O—O—X—X=6 in subtracting code. |
| 7 | 3 | X—O—X—X=7 in subtracting code. |
| 6 | 4 | O—X—X—X=8 in subtracting code. |
| 5 | 5 | X—X—X—X=9 in subtracting code. |
| | | O—O—O—O=0 (carry after 5 pulses)—Readout "5". |
| 4 | 6 | X—O—O—O=1 in adding code. |
| 3 | 7 | O—X—O—O=2 in adding code. |
| 2 | 8 | X—X—O—O=3 in adding code. |
| 1 | 9 | O—O—X—O=4 in adding code. |
| 0 | 10 | X—O—X—O=5 in adding code—Restore "5". |

At "5" index time, the carry pulse causes a "5" to be read out as by operation of a print bar or to select a punch in a well-known way.

*Example 2.—4 minus 9*

This example is selected to show the action when the minuend is less than the subtrahend. The order will operate as follows:

TABLE VIII.—QUINARY

| Pulse | Trigger Status and Representation |
|---|---|
| | X—X—X—O=4 in adding code. |
| 1 | O—X—X—O=3 in subtracting code. |
| 2 | X—O—X—O=2 in subtracting code. |
| 3 | O—O—X—O=1 in subtracting code. |
| 4 | O—O—O—O=0 in subtracting code. |
| 5 | X—X—X—X=9 in subtracting code. |
| 6 | O—X—X—X=8 in subtracting code. |
| 7 | X—O—X—X=7 in subtracting code. |
| 8 | O—O—X—X=6 in subtracting code. |
| 9 | O—O—O—X=5 in both codes. |

Obviously the result will roll as "5" when ten pulses are added.

The operation of the binary register is shown by the following table:

TABLE IX.—BINARY

| Pulse | Trigger Status and Representation Subtracting |
|---|---|
| | O—O—X—O=4 in adding code. |
| 1 | X—X—O—O=3 in adding code. |
| 2 | O—X—O—O=2 in adding code. |
| 3 | X—O—O—O=1 in adding code. |
| 4 | O—O—O—O=0 in both codes. |
| 5 | X—X—X—X=9 in subtracting code. |
| 6 | O—X—X—X=8 in subtracting code. |
| 7 | X—O—X—X=7 in subtracting code. |
| 8 | O—O—X—X=6 in subtracting code. |
| 9 | X—O—X—X=5 in subtracting code. |

| Index Time | Readout Pulse | Rolling |
|---|---|---|
| 9 | 1 | O—O—X—X=6 in subtracting code. |
| 8 | 2 | X—O—X—X=7 in subtracting code. |
| 7 | 3 | O—X—X—X=8 in subtracting code. |
| 6 | 4 | X—X—X—X=9 in subtracting code. |
| 5 | 5 | O—O—O—O=0 (carry after 5 pulses)—Readout "5". |
| 4 | 6 | X—O—O—O=1 in adding code. |
| 3 | 7 | O—X—O—O=2 in adding code. |
| 2 | 8 | X—X—O—O=3 in adding code. |
| 1 | 9 | O—O—X—O=4 in adding code. |
| 0 | 10 | X—O—X—O=5 in adding code—Restore "5". |

The foregoing examples assumed that initially the register order contained a digit represented by the adding codes. Now let it be assumed that "8" is to be subtracted from "3" as represented in the subtracting code. The operation is as follows:

TABLE X.—QUINARY

| Pulse | Trigger Status and Representation Subtracting |
|---|---|
| | O—X—X—O=3 in subtracting code. |
| 1 | X—O—X—O=2 in subtracting code. |
| 2 | O—O—X—O=1 in subtracting code. |
| 3 | O—O—O—O=0 in both codes. |
| 4 | X—X—X—X=9 in both codes. |
| 5 | O—X—X—X=8 in subtracting code. |
| 6 | X—O—X—X=7 in subtracting code. |
| 7 | O—O—X—X=6 in subtracting code. |
| 8 | O—O—O—X=5 in subtracting code. |

| Index Time | Readout Pulse | Rolling |
|---|---|---|
| 9 | 1 | X—O—O—X=6 in adding code. |
| 8 | 2 | O—X—O—X=7 in adding code. |
| 7 | 3 | X—X—O—X=8 in adding code. |
| 6 | 4 | X—X—X—X=9 in adding code. |
| 5 | 5 | O—O—O—O=0 (carry after 5 pulses)—Readout "5". |
| 4 | 6 | X—O—O—O=1 in adding code. |
| 3 | 7 | O—X—O—O=2 in adding code. |
| 2 | 8 | X—X—O—O=3 in adding code. |
| 1 | 9 | X—X—X—O=4 in adding code. |
| 0 | 10 | O—O—O—X=5 in adding code—Restore "5". |

TABLE XI.—BINARY

| Pulse | Trigger Status and Representation Subtracting |
|---|---|
| | X—O—O—X=3 in subtracting code. |
| 1 | O—O—O—X=2 in subtracting code. |
| 2 | X—O—O—O=1 in subtracting code. |
| 3 | O—O—O—O=0 in subtracting code. |
| 4 | X—X—X—X=9 in subtracting code. |
| 5 | O—X—X—X=8 in subtracting code. |
| 6 | X—O—X—X=7 in subtracting code. |
| 7 | O—O—X—X=6 in subtracting code. |
| 8 | X—X—O—X=5 in subtracting code. |

| Index Time | Readout Pulse | Rolling |
|---|---|---|
| 9 | 1 | O—O—X—X=6 in subtracting code. |
| 8 | 2 | X—O—X—X=7 in subtracting code. |
| 7 | 3 | O—X—X—X=8 in subtracting code. |
| 6 | 4 | X—X—X—X=9 in subtracting code. |
| 5 | 5 | O—O—O—O=0 (carry after 5 pulses)—Readout "5". |
| 4 | 6 | X—O—O—O=1 in adding code. |
| 3 | 7 | O—X—O—O=2 in adding code. |
| 2 | 8 | X—X—O—O=3 in adding code. |
| 1 | 9 | O—O—X—O=4 in adding code. |
| 0 | 10 | X—O—X—O=5 in adding code—Restore "5". |

The table below shows how trigger representations which are different but correspond in digit value nevertheless will be correctly read out as the proper digit value. It is assumed the quinary register contains a "6" and the binary register a "2" for the sake of greater variety of illustrations.

TABLE XII.—ROLLING

*Differing codes of equivalent value*

QUINARY ROLLING

| Index Time | Roll Pulses | Initially in Adding Code | | | | | Initially in Subtracting Code | | | | |
|---|---|---|---|---|---|---|---|---|---|---|---|
| | | T1 | T2 | T4 | T5 | | T1 | T2 | T4 | T5 | |
| 9 | 1 | X | O | O | X | =0 | O | O | X | X | =6 |
| 8 | 2 | O | X | O | X | X | O | X | X | X | =7 |
| 7 | 3 | X | X | O | X | O | X | X | X | =8 |
| 6 | 4 | X | X | X | X | X | X | X | X | =9 |
| | | O | O | O | O | =0 | O | O | O | O | =0 |
| | | | | | | (carry after 4 pulses) | | | | | |
| | | | | | | Read out "6" | | | | | |
| 5 | 5 | X | O | O | O | X | O | O | O | =1 |
| 4 | 6 | O | X | O | O | X | X | O | O | =2 |
| 3 | 7 | X | X | O | O | X | X | O | O | =3 |
| 2 | 8 | X | X | X | O | X | X | X | O | =4 |
| 1 | 9 | O | O | O | O | X | O | O | X | =5 |
| 0 | 10 | X | O | O | X | X | O | O | X | =6 |
| | | | | | | Restore "6" | | | | | |

BINARY ROLLING

| | | | | | | | | | | | |
|---|---|---|---|---|---|---|---|---|---|---|---|
| 9 | 1 | O | X | O | O | =0 | O | O | O | X | =2 |
| 8 | 2 | X | X | O | O | X | O | O | X | |
| 7 | 3 | O | O | X | O | X | X | O | X | |
| 6 | 4 | X | O | X | O | X | X | O | X | |
| 5 | 5 | O | X | X | O | X | O | X | X | |
| 4 | 6 | X | X | X | O | X | X | X | X | |
| 3 | 7 | O | X | X | X | X | X | X | X | |
| 2 | 8 | X | X | X | X | X | X | X | X | |
| | | O | O | O | O | =0 | O | O | O | O | =0 |
| | | | | | | (carry after 8 pulses) | | | | | |
| | | | | | | Read out "2" | | | | | |
| 1 | 9 | X | O | O | O | X | O | O | O | |
| 0 | 10 | O | X | O | O | =0 | X | O | O | =2 |
| | | | | | | Restore "2" | | | | | |

The register may be used in a multiplying or dividing machine to control the number of pulses to another register. For example, the pulses appearing on wire W24 may be applied to another register and terminated under control of gate G1 when the register disclosed in Figs. 1A to 1F is restored to zero as indicated by the block marked "Controlled Register" in Fig. 1A. A good illustration of how such a control may be exercised is given in application Serial No. 386,462 filed October 16, 1953, now Patent No. 2,802,625, by Arthur H. Dickinson in which parallel entries of pulses by addition in a multiplicand register are terminated when a multiplier register similar to the one disclosed herein is reduced to zero.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electronic register comprising a plurality of orders each order having a series of trigger stages representing by different ones of a plurality of stable states, different components of a non-decimal system, the sum of any combination of said states representing a digital value, means to apply digitally valued entry pulses to at least one of said stages in each order to enter digital values in said orders, means to couple said stages for control of addition and subtraction including a plurality of add switch tubes for coupling said stages for addition and a plurality of subtract switch tubes for coupling said stages for subtraction, a plurality of add-subtract correction tubes responsive to a change to a predetermined stable state of a predetermined one of the stages in each order for effecting a feedback to other stages to convert the representation of said stages to the decimal number system, certain of said correction tubes being effective for an addition correction and the others for a subtraction correction, and means for selectively rendering effective the add switch tubes and addition correction tubes or the subtract switch tubes and the subtraction correction tubes.

2. An electronic register comprising a plurality of orders each order having a series of trigger stages representing, by different ones of a plurality of stable states, different components of a quinary system, the sum of any combination of said states representing a digital value in a quinary system of numbers, means to apply digitally valued entry pulses to at least one of said stages in each order to enter digital values in said orders, means to couple said stages for control of addition and subtraction including a plurality of add switch tubes for coupling said stages for addition and a plurality of subtract switch tubes for coupling said stages for subtraction, a plurality of add-subtract correction tubes responsive to a change to a predetermined stable state of a predetermined one of the stages in each order for effecting a feedback to other stages to convert the quinary representation of said stages to the decimal number system, certain of said correction tubes being effective for an addition correction and the others for a subtraction correction, and means for selectively rendering effective the add switch tubes and quinary addition correction tubes or the subtract switch tubes and the quinary subtraction correction tubes.

3. In combination, an electronic register comprising a plurality of denominational orders, each order having a series of trigger stages representing the components of a non-decimal system of numbers; means intercoupling said stages in cascade for functioning to register the successive terms of said non-decimal system of numbers including separate coupling means for addition or subtraction, said stages, when coupled in cascade by one or the other of said separate coupling means functioning as a complete register order in accordance with said non-decimal system; means to selectively render one or the other of said coupling means effective, and means rendered operative by a change of state of a predetermined one of said stages to reverse the state of other predetermined stages to correct the representation of said register order to the decimal system.

4. An electronic register comprising a plurality of denominational orders, each denominational order including a series of bistable trigger stages, each trigger stage having a plurality of outputs and a common input, a predetermined one of the stable states of each trigger stage in a series representing one of a series of basic components of a non-decimal number series; electronic add-subtract-control means for conditioning said orders for either addition or subtraction and including in each order a series of addition coupling tubes and a series of subtraction coupling tubes, an addition coupling tube and a subtraction coupling tube coupling the common input of each trigger stage in the series to the outputs of the preceding stages to connect each series of stages in cascade for operation as a single digital order; means to pulse the common inputs of the first stages of each series to effect digital entries according to the decimal system, means to selectively render effective either the addition coupling tubes or the subtraction coupling tubes and selective feedback means from a predetermined one of the stages in each order to preceding stages in the same order for effecting a correcting entry to convert the non-decimal representation of any order to decimal representation and selectively conditioned by the means for selectively rendering effective the coupling tubes.

5. In combination, an electronic register comprising a plurality of orders, each order having a series of electronic trigger stages, each stage representing by a plurality of different stable states the components of a non-decimal system of numbers, combinations of said states of said triggers in each order representing the digits of the decimal system of numbers, means to apply pulses to at least one of said stages in each order to enter digit values;

means to couple said stages in cascade for addition or subtraction including add switch tubes and subtract switch tubes, a plurality of correction tubes responsive to predetermined changes of state of predetermined ones of the trigger stages of each order and operative to change the state of other stages to effect corrections of the non-decimal representations of said stages to decimal representations, said correction tubes being selectively responsive to different changes of state of the controlling triggers according to whether the coupling means is conditioned for adding or subtraction, and selecting means to render the add switch tubes and certain ones of the correction tuces effective for addition and the subtraction switch tubes and others of the correction tubes effective for subtraction.

6. In combination, an electronic register comprising a plurality of denominational orders, each order having a series of trigger stages representing the components of a quinary system of numbers, normally ineffective means intercoupling said stages in cascade for functioning as a quinary register including selective electronic switching means, one for coupling said orders for addition and the other for coupling said orders for subtraction, means to render one or the other of said switching means effective, normally ineffective feedback means responsive to one state of a predetermined stage in each order for causing a change of state of other predetermined stages in the same order to add a correcting factor, normally ineffective feedback means responsive to the opposite state of said first predetermined stages for effecting a change of state of said other predetermined stages to subtract said correcting factor, and means for conditioning one or the other of the feedback means effective according to whether the selective electronic switching means has been made effective for addition or subtraction.

7. An electronic quinary register comprising a plurality of denominational orders, each order having a series of bistable trigger stages representing the component values 1, 2, 4, 5 of a quinary system of numbers, each trigger stage having a common input and an output for each stable state, one output for addition and the other for subtraction, electronic switching means for selectively coupling the outputs of each stage to the input stage of next higher component value, selective feedback circuits, one for adding and one for subtracting, coupling the adding output of the "4" stage to the adding output of the "1" and "2" stages and the other coupling the subtracting output of the "4" stage to the subtracting outputs of the "1" and "2" stages to effect a correction to add "3" when adding or subtract "3" when subtracting each time the "4" stage goes to the state representing "4" when adding or to the state representing a reduction of "4" when subtracting according to the type of operation selected, and means for conditioning the electronic switching means for addition and subtraction and selecting the appropriate one of said feedback circuits for operation.

8. An electronic register comprising a plurality of denominational orders, each order having a series of bistable trigger stages representing a series of component values of a non-decimal number system arranged in numerical order for cascade operation with input to a lowest valued component stage and carry from the highest valued component stage of any order to the lowest valued component stage of the next highest order, each trigger stage having two outputs, one for add and the other for subtract, and a common input, one stable state of each trigger representing zero and the other stable state a component value; selectively conditionable interstage coupling circuits for selectively connecting the add and subtract outputs of each stage to the common input of the next higher component value stage to render the latter stage responsive to one or the other of the outputs of the perceding stage upon a change of state of the preceding stage according to whether the coupling circuits have been selectively conditioned for add or subtract operation; and selective circuit means in each order responsive to a change of stable state of a higher valued component stage, according to whether the coupling circuits have been conditioned for addition or subtraction, for causing a change in state of predetermined lower value component stages to effect correction of the representation of the affected order to the decimal system.

9. In combination, an electronic register of the non-decimal type having a plurality of component value trigger stages and means to couple the stages in cascade for operation as a non-decimal counter, said coupling means being selectively reversible for either forward or reverse counting according to the non-decimal system, means to selectively reverse the coupling means, and correction circuits selectively rendered effective by the selective reversing means and controlled by changes of stable state of one component value stage, for effecting a change of stable state of predetermined other stages to correct the representation of said triggers to the decimal system.

10. In combination, an electronic register of the quinary type having a series of trigger stages representing the component values 1, 2, 4, 5 of a quinary system of numbers and means to couple the stages in cascade for operation as a quinary counter, said coupling means being selectively reversible for either forward or reverse counting, means to reverse the coupling means; and correction circuits selectively made operative by the reversing means and controlled by a change in state of the "4" component value trigger for changing the state of the "1" and "2" triggers to add 3 or subtract 3, according to whether the coupling means is in adding condition or reversed, whenever the "4" trigger changes state.

11. An electronic register comprising a plurality of denominational orders, each order having a series of bistable triggers, each trigger having "Off" and "On" stable states and representing, when in "On" status, different component values which, singly or in combination, represent the successive values of a continuous series of non-decimal numbers, each trigger having a single input and two outputs, one output for addition and the other for subtraction, each order having a series of add coupling tubes for connecting the add outputs of said triggers to the inputs of the next triggers in the series and a series of subtract coupling tubes for connecting the subtract outputs of said triggers to the inputs of the next triggers in the series, for operation of the triggers in cascade for addition or subtraction as a counter according to said series of numbers, each order also having a series of add correction tubes operable to place certain triggers in "On" status to add a predetermined correction factor for converting the representation of the triggers to the decimal system while adding and a corresponding series of subtract correction tubes for placing said certain triggers in "Off" status to subtract the said factor when subtracting, each of said series of correction tubes including a conditioning tube responsive to changes in status from "Off" to "On" and vice versa, for addition and subtraction respectively, of a predetermined one of said stages, each of said orders being provided with a pair of carry coupling tubes, one for addition and one for subtraction, for coupling the add and subtract outputs of the final triggers in each order to the common input of the next higher order; and means for selectively rendering effective either the add coupling, correction and carry tubes or the subtract coupling, correction, and carry tubes.

12. An electronic register comprising a plurality of denominational orders, each order having a series of bistable trigger stages, each stage having "Off" and "On" stable states and representing, when in "On" status, one of the components 1, 2, 4, 5 of a quinary system of numbers, each stage having an add output, a subtract output and a common input, each order also having a series of add interstage coupling tubes for coupling the add outputs of each stage to the common input for the next higher valued stage and an add carry tube for coupling the add output of the "5" stage to the common input of the "1" stage of the next higher order and a corresponding series of subtract interstage coupling and carry tubes, selectively settable correction means responsive to a change of state of the "4" trigger stage for turning on the "1" and "2" stages during addition operations or turning off the "1" and "2" stages during subtraction operations, and means for selectively rendering effective either the add or the subtract interstage coupling tubes and at the same time selectively setting the correction means for addition or subtraction, respectively.

13. An electronic register comprising a plurality of denominational orders, each order having a series of bistable trigger stages, each stage having "Off" and "On" stable states and representing, when in "On" status, one of the components 1, 2, 4, 8 of a binary system of numbers, each stage having an add output, a subtract output and a common input, each order also having a series of add interstage coupling tubes for coupling the add outputs of each stage to the common input for the next higher valued stage and an add carry tube for coupling the add output of the "8" stage to the common input of the "1" stage of the next higher order and a corresponding series of subtract interstage coupling and carry tubes, selectively settable correction means responsive to a change of state of the "8" trigger stage for turning on the "2" and "4" stages during addition operations or turning off the "1" and "4" stages during subtraction operations, and means for selectively rendering effective either the add or the subtract interstage coupling tubes and at the same time selectively setting the correction means for addition or subtraction, respectively.

14. In an electronic register of the type composed of a plurality of denominational orders in which each order comprises a series of stages disposed for cascade operation as a counter and in which the stages of each series represent, singly or in combination, the component values of a continuous number series exceeding ten terms, electronic means to couple the stages in cascade for adding and for adding carry from lower to higher orders, electronic means to couple the stages in cascade for subtracting and subtracting carry from lower to higher orders, an additive decimal correction means, a subtractive decimal correction means, means responsive to one of the stages in each series for initiating a decimal correction, and means to selectively render effective one or the other of the coupling means and having means to place one or the other of the correcting means under control of the initiating means.

15. In an electronic register of the type composed of a plurality of denominational orders in which each order includes a series of polystable trigger stages adapted for cascade operation as a counter, predetermined stable states of said trigger stages representing different basic component values which taken singly and in combination represent a continuous series of numbers greater than ten; electronic means to couple the different trigger stages of each order in cascade for operation additively as a counter following said series of numbers, electronic means to couple said trigger stages in each order in cascade for operation as a retrogressing counter reversely following said series of numbers, add decimal correction control means for each order and responsive to a change to a predetermined stable state of a predetermined trigger stage in each order, subtract decimal correction control means associated with the add decimal correction control means for each order and responsive to a change to a different predetermined state of the same predetermined trigger stage of such order, add correction means in each order operative to effect a change to predetermined states, representing the addition of a decimal correction value, of preceding trigger stages of each order, subtract correction means associated with the add correction means in each order and operative to effect a change of the same preceding trigger stages of such order to different states representing the subtraction of said correction value, and means to selectively render operative one or the other of the coupling means to condition the register for additive or subtractive operation and for placing the add correction means under control of the add decimal correction control means or the subtract correction means under control of the subtract correction control means.

16. In an electronic register of the binary type composed of a plurality of denominational orders in which each order comprises a series of binary stages disposed for cascade operation as a binary counter, means for coupling the stages in cascade for binary addition and for adding carry to a higher order, means to couple the stages in cascade for binary subtraction and subtraction carry to a higher order, an additive decimal correction means, a subtractive decimal correction means, means responsive to one of said stages for initiating a decimal correction in other stages, and means to selectively render effective one or the other of the coupling means and for placing one or the other of the correcting means under control of the initiating means.

17. In an electronic register of the binary type composed of a plurality of denominational orders in which each order includes a series of bistable trigger stages adapted for cascade operation as a binary counter, predetermined stable states of said trigger stages representing the binary component values 1, 2, 4, 8 of a binary progression of numbers, means to couple the different trigger stages of each order in cascade for operation additively as a binary counter, means for coupling the same trigger stages in cascade for operation as a binary retrogressing counter, add decimal correction control means responsive to change to one stable state of the "8" trigger stage, subtract decimal correction control means associated with the add decimal correction control means and responsive to a change of the "8" trigger stage to the other stable state, add correction means in each order for effecting a change of the "2" and "4" trigger stages to the predetermined state to add "6" in said order, subtract correction means associated with the add correction means in the same order and operative to effect a change of the "2" and "4" trigger stages to the opposite state to effect subtraction of "6" in said order, and means to render operative one or the other of the coupling means to condition the register for additive or subtractive operation and for placing the add correction means under control of the add decimal correction control means or the subtract correction means under control of the subtract correction control means.

18. In an electronic register of the quinary type composed of a plurality of denominational orders in which each order includes a series of bistable trigger stages adapted for cascade operation as a quinary counter, predetermined stable states of said trigger stages representing the quinary component values 1, 2, 4, 5 of a quinary progression of numbers, means to couple the different trigger stages of each order in cascade for operation additively as a quinary counter, means for coupling the same trigger stages in cascade for operation as a quinary retrogressing counter, add decimal correction control means responsive to change to one stable state of the "4" trigger stage, subtract decimal correction control means associated with the add decimal correction control means and responsive to a change of the "4" trigger stage to the other stable state, add correction means in each order for effecting a change of the "1" and "2" trigger stages to the predetermined state to add "3" in said order, subtract correction means associated with the add correction means in the same order and operative to effect a change of the "1" and "2" trigger stages to the opposite state to effect subtraction of "3" in said order, and means to render operative one or the other of the coupling means to condition the register for additive or subtractive operation and for placing the add correction means under control of the add decimal correction control means or the subtract correction means under control of the subtract correction control means.

19. An electronic register comprising a plurality of denominational orders, each order having a series of bi-stable trigger stages, each stage, when in one predetermined stable state representing a component value of a number series and representing zero in the opposite stable state, means to couple said stages in cascade for additive operation as a counter in which consecutive members of a continuous series are represented by different adding code combinations of said trigger stages in the predetermined state, means to couple said stages in cascade for operation as a subtracting counter in which said consecutive members are represented by subtracting code combinations, differing from the adding code, of the predetermined state, means responsive to a change of a predetermined one of said stages to the predetermined state for effecting a correction of the adding code to the decimal system of numbers, means responsive to a change of said predetermined one of said stages to the state opposite the predetermined state for effecting a correction of the subtracting code to the decimal system of numbers, and selective means to render operative either the first coupling means and first correction means or the second coupling means and second correction means.

20. A register comprising a series of denominational orders, each order including a series of digit elements representing by a change from an "Off" state to an "On" state different component values of a number system, means to additively couple said elements for operation as a counter in which successive digits are represented by an adding code composed of said elements in "On" state singly and in various combinations, means to subtractively couple said elements for operation as a subtracting counter in which the same successive digits are represented by said elements in "On" state singly and in combination according to a different subtracting code, means to effect a decimal code correction according to whether the first coupling means or second coupling means is effective, means for effecting a carry operation from one order to the next higher order, and means to selectively condition the coupling means for operation.

21. A quinary electronic register having a plurality of denominational orders, each order having a series of 1, 2, 4, 5 triggers, means for additive cross coupling of said triggers for operation to represent consecutive digits by an adding code, means for subtractive cross coupling said triggers for operation to represent consecutive digits by a subtracting code which differs from the adding code, add carry circuits between the "5" triggers of each order and the "1" triggers of the next higher orders, parallel subtract carry circuits, selectively settable means controlled by the "4" triggers of each order for changing the status of the "1" and "2" triggers when adding and subtracting, respectively, and selective means for rendering effective either the additive cross coupling means and add carry circuits or the subtractive cross coupling means and for selectively setting the settable means for adding or subtracting.

22. An electronic register comprising a plurality of orders, each order including a series of trigger circuits responsive to pulses representing digits, each series representing different digits according to changes of trigger status taken singly and in various combinations according to a code, selectable circuit means for coupling the trigger circuits of each series in cascade for either addition or subtraction according to an addition code or according to a subtracting code which differs from the addition code, decimal correction circuits for said orders for effecting either an adding correction or a subtracting correction to the decimal system of numbers, and switching means for selectively conditioning the selectable circuit means and the decimal correction circuits for either addition or subtraction.

References Cited in the file of this patent
UNITED STATES PATENTS

| | | |
|---|---|---|
| 2,462,275 | Morton et al. | Feb. 22, 1949 |
| 2,500,294 | Phelps | Mar. 14, 1950 |
| 2,521,774 | Bliss | Sept. 12, 1950 |
| 2,566,918 | Bergfors | Sept. 4, 1951 |
| 2,566,933 | Dickinson | Sept. 4, 1951 |
| 2,584,363 | Mumma | Feb. 5, 1952 |
| 2,626,752 | Williams | Jan. 27, 1953 |
| 2,656,106 | Stabler | Oct. 20, 1953 |
| 2,703,202 | Cartwright | Mar. 1, 1955 |
| 2,731,201 | Harper | Jan. 17, 1956 |
| 2,735,005 | Steele | Feb. 14, 1956 |
| 2,750,114 | Crosman | June 12, 1956 |
| 2,766,936 | Dimmer | Oct. 16, 1956 |

OTHER REFERENCES

Journal of the Optical Society of America, vol. 43, No. 10, October 1953, pp. 839–848, article entitled A Bidirectional Electronic Counter, by F. H. Branin, Jr.